Nov. 23, 1965  G. F. BECKWELL  3,218,838
TUBE END SHAPER
Filed Jan. 21, 1963                              2 Sheets-Sheet 1
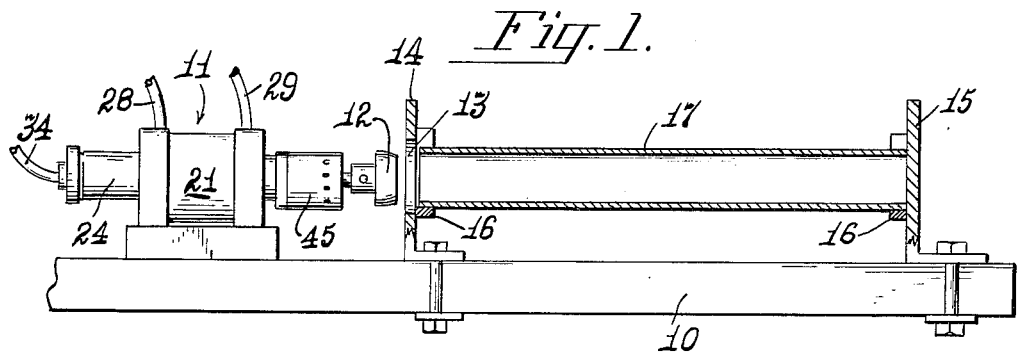
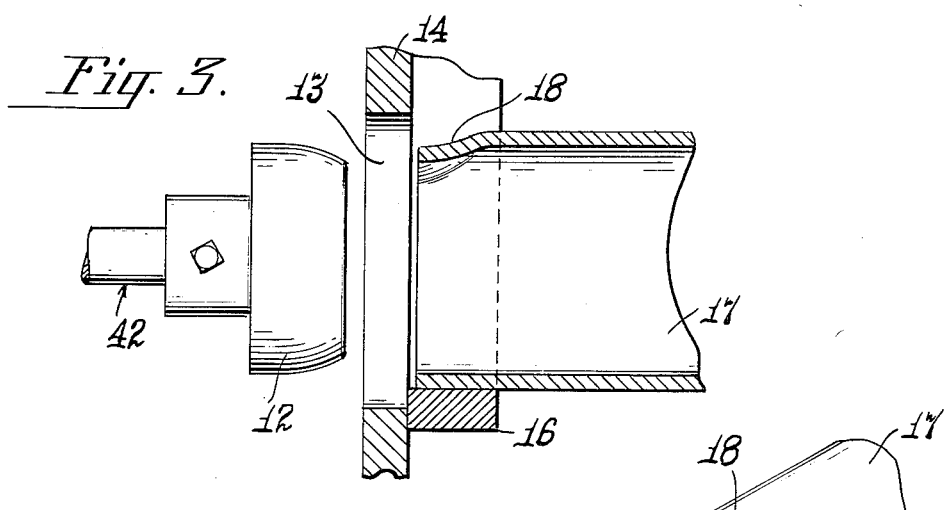
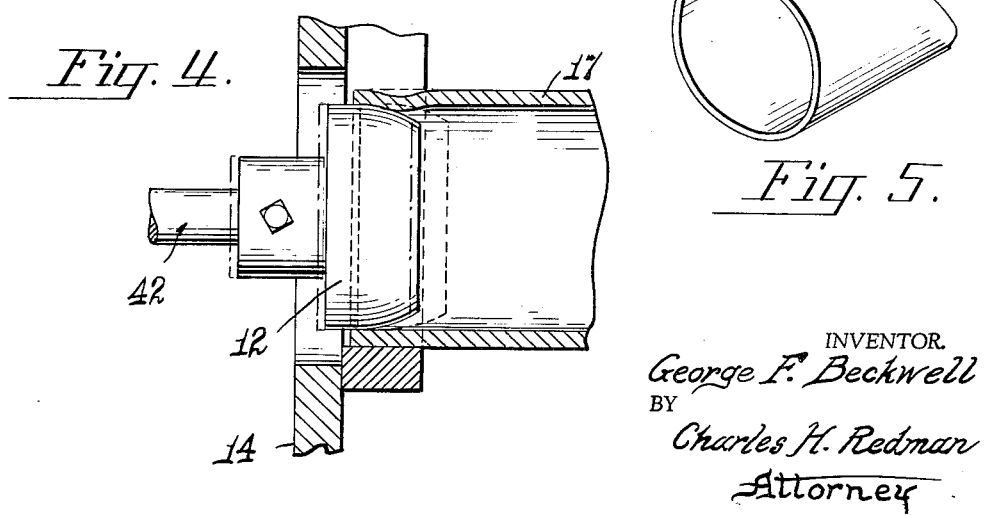
INVENTOR.
George F. Beckwell
BY Charles H. Redman
Attorney INVENTOR.
George F. Beckwell
BY Charles H. Redman
Attorney.

United States Patent Office 3,218,838
Patented Nov. 23, 1965

3,218,838
TUBE END SHAPER
George F. Beckwell, Sugar Grove, Ill., assignor to Pines Engineering Co., Inc., Aurora, Ill., a corporation of Illinois
Filed Jan. 21, 1963, Ser. No. 252,715
2 Claims. (Cl. 72—370)

The present invention relates to improvements in the method of and apparatus for re-shaping the end of a length of tubular or like stock and is more particularly concerned with the novel construction and assembly of apparatus operable automatically to straighten out deformations in the end of sheared tubular stock.

More particularly, the apparatus is useful in trueing the perimeter edge of sheared tubular stock which, because of the impact of the shearing tool, has become deformed to the extent of being out of round. Usually such deformation takes the form of a depressed area or dimple on the cut edge, occurring in the region of initial impact of the shearing tool. While designed primarily for de-dimpling, the apparatus is useful also for flaring, flanging, beading or shrinking the end of tubular stock, such other functions being effected by changing the mandrel. In the embodiment disclosed, a hydraulic reciprocable engine is provided for carrying a mandrel into abutment with the deformed end of the tubular stock and having therein a piston or hammer arranged to reciprocate at an extremely high frequency so as to repeatedly strike the mandrel for urging it into the deformed end of the tubular stock. Automatic means is provided for effecting operation of the apparatus so as to render the apparatus useful for high speed production.

It is, therefore, an object of the invention to provide a device of the character referred to.

Another object is to provide apparatus of novel construction for vibrating a mandrel in the direction of its axis.

Another object is to provide an apparatus of the character referred to which is not expensive to manufacture or operate, is simple in its construction, positive in operation, and very efficient in use.

With the foregoing and such other objects and advantages in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a side elevational view of the apparatus, showing parts in section and a length of tubular stock in place therein;

FIG. 3 is an enlarged detail view of the mandrel showing it spaced from a length of dimpled tubular stock;

FIG. 4 is a view similar to FIG. 3, showing the mandrel in positions assumed during operation of the apparatus; and, FIG. 5 is a perspective view of a dimpled end of a length of tubular stock.

Figure 2:
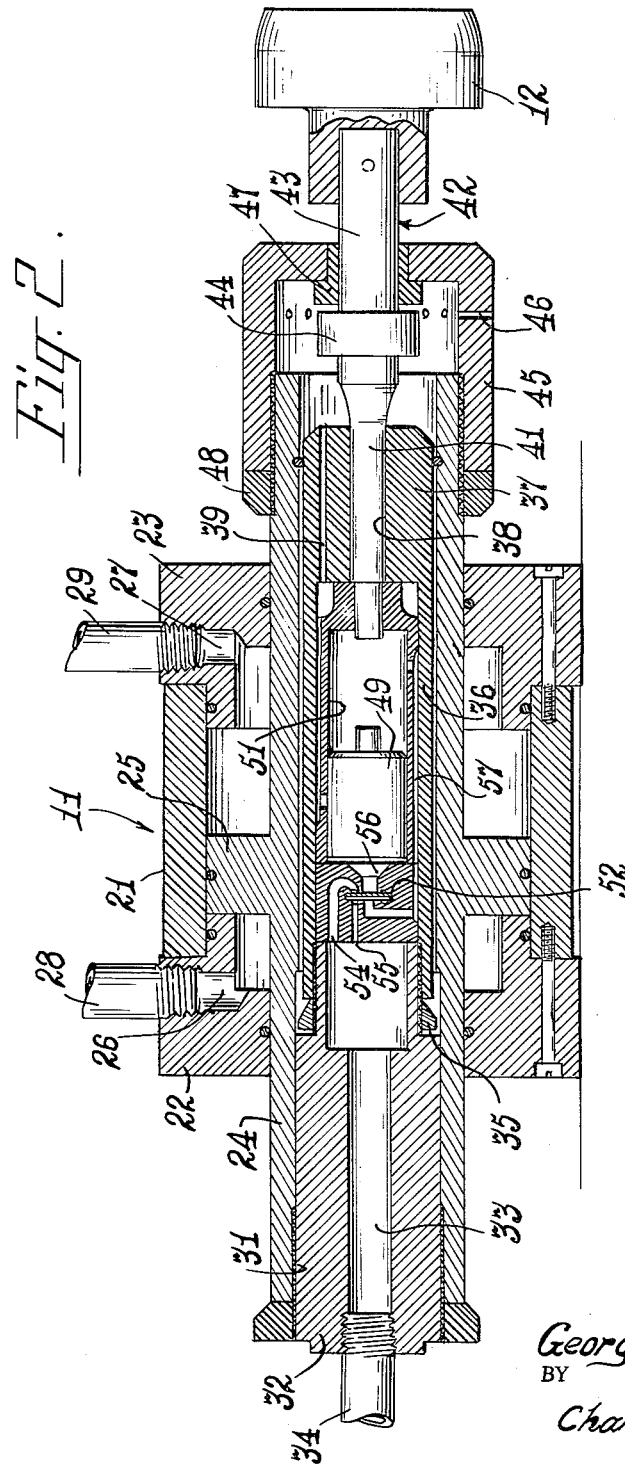
FIG. 2 is an enlarged diametrical sectional view of the reciprocable engine and mandrel.

Referring to the accompanying drawings and particularly to the exemplary disclosure of the apparatus in FIG. 1, the apparatus which is mounted on a support surface 10, includes a reciprocable engine 11 mounting a mandrel 12 that is opposed to an opening 13 in a rigid upstanding plate 14. Spaced a requisite distance from said plate 14 is an adjustably mounted second or abutment plate 15.

The plates 14 and 15 have, on their opposed faces, a saddle 16 in which the end portions of a length of tubular stock 17 to be processed are seated. The plate 15 constitutes a stop to prevent axial shifting of the tubular stock in the direction of said plate and said plate 15 is adjustable along the support to adopt the apparatus to receive tubular stock of different lengths. As noted hereinabove, the apparatus is intended primarily for the reshaping of a deformed or dimpled area 18 (FIG. 5) in the end of tubular stock which dimpling resulted from the impact of a shearing tool. In order to accomplish this quickly, the hydraulic engine 11 and mandrel 12 are provided.

Referring now to FIG. 2, said engine comprises a cylindrical body 21 capped at each of its ends, as by caps 22, 23, each having a bore therein through which extend opposite ends of a reciprocable cylinder 24. The cylinder 24 includes an external circumferential flange 25 located between its ends and which has a slide fit in body 21 so as to function in the manner of a piston. The interior of body 21 has passages 26, 27 communicating with the exterior of the body and to which conduits 28, 29, respectively, are connected for connecting the interior of said body with a source of hydraulic pressure, in this instance air. Insofar as described, when air under pressure is admitted into either end of body 21, the piston 25 and its cylinder 24 are thrust in the direction of the opposite end of said body.

One end of cylinder 24 is internally threaded, as at 31, to receive threaded thereinto a fitting 32 having an axial bore 33 with which is connected a conduit 34 leading from a source of air pressure. The interior end of said fitting 32 has an externally threaded nipple 35 of reduced diameter onto which is threaded one end of an internal sleeve 36, the other end of which is closed by an end wall 37 of considerable thickness and having an axial bore 38 and a radially offset air exhaust passageway 39 therein.

The bore 38 slidingly receives the stem portion 41 of a ram 42. Said ram 42 includes a free end portion 43 of larger diameter than its stem portion 41 and an intermediate external flange 44. The ram 42 is held in place by a cap 45 that is screw-threaded onto the adjacent end of cylinder 24. Said cap has one or more radial ports 46 through which air flowing through exhaust passageway 39 is discharged to the atmosphere. The cap 45 carries an axial bearing sleeve 47 through which the end portion 43 of the ram extends and against which the external flange 44 abuts when the ram is in one of the positions of axial shifting assumed during operation of the apparatus. Preferably, a lock ring 48 is provided to secure the cap 45 in a pre-selected position on cylinder 24.

As noted hereinabove, the ram 42 is slidable axially in both directions relative to cylinder 24 and cap 45. Such axial sliding is an outward direction is effected by means of an auxiliary piston or hammer 49 that is reciprocable in an inner cylinder 51 mounted firmly in the internal sleeve 36 between the end wall 37 and a valve fitting 52. This valve fitting and the valve element therein are of conventional construction in which the valve element flutters between two extreme positions under the influence of pressurized air admitted through line 34. More specifically, the valve includes a wafer type valve element 53 and ports 54 and 55, one larger than the other and one leading from the inlet line to each side of said wafer 53. In operation, and with the piston-hammer 49 in the retracted position shown, air is admitted into the back end of cylinder 51 through the larger port 54 and a passage 56.

The hammer 49 is driven in a forward direction to impact the projecting end 41 of ram 42, thus driving the air in advance of said hammer through passageway 56 and against the wafers 53 causing said wafer to shift into a position for closing passage 56 and placing the port 55 in direct communication with a passageway 57. Pressurized air then is admitted into the forward end of cylinder 51 to drive the hammer rearwardly. Movement of the hammer in this reverse direction generates pressure in the rear end of the cylinder 51 sufficient to reverse the position of the wafer element and cause repeat operation. The movements of the hammer and the wafer element are of very high frequency thus the ram, and the mandrel 12 mounted thereon, is vibrated at high frequency for a purpose to be explained.

In use, a length of tubular stock 17 is laid in the saddles 16, with one end abutting the stop plate 15 and its deformed or dimpled end in registering alignment with the opening in plate 14. Hydraulic pressure is then applied to the main cylinder of the engine 11 to advance the mandrel 12 toward and constantly urge it into abutment with the deformed end of the tubing. As soon as this occurs automatic valves (not shown) are actuated to admit pressurized air into hammer cylinder 51, whereupon the hammer is reciprocated at a very high velocity so as to cause the mandrel to progressively advance into the opposite end of the tubular stock and straighten out the dimple or other deformity therein, thus rendering the said tube end truly circular.

The saddles 16 are replaceable by saddles of other sizes so as to adapt the apparatus for operation on tubular stock of different diameters. Also, upon removing the mandrel illustrated, and replacing it with a mandrel of another size, tubular stock of different diameters may be accommodated. Further, upon replacing the mandrel with a tool of another peripheral contour tubular stock can be internally or externally flanged, expanded, beaded or shrunk.

As many possible embodiments may be made in the invention, and as many changes might be made in the embodiment above set forth, it is to be understood that all matters hereinabove set forth or shown in the accompanying drawings are to be interpreted as illustrative and not in a limiting sense.

What I claim and desire to secure by Letters Patent of the United States is:

1. The method of reshaping a deformed end of a length of tubular stock which comprises, supporting a length of tubular stock firmly against endwise movement, placing a shaping tool in tight abutment with the deformed end of the tubular stock, maintaining pressure on said tool in the direction of the axis of said stock, and vibrating said tool in the direction of the axis of the tubular stock at high velocity while maintaining said axial pressure so as to cause the tool and stock to assume a telescoped relation whereby the tubular stock is reshaped.

2. The method of reshaping a deformed end of a length of tubular stock which comprises, supporting a length of tubular stock firmly against endwise movement, placing a shaping tool in tight abutment with the deformed end of the tubular stock, maintaining hydraulic pressure on said tool in the direction of the axis of said stock, and vibrating said tool under applied air pressure in the direction of the axis of the tubular stock at high velocity while maintaing said axial pressure so as to cause the tool and stock to assume a telescoped relation whereby the tubular stock is reshaped.

References Cited by the Examiner

UNITED STATES PATENTS

| | | | |
|---|---|---|---|
| 1,722,389 | 7/1929 | Opie | 29—401 |
| 2,441,517 | 5/1948 | Sussman. | |
| 2,506,657 | 5/1950 | Webster | 113—116 |
| 2,943,386 | 7/1960 | Katz | 29—401 |
| 3,059,689 | 10/1962 | Lane | 153—80.5 |
| 3,078,905 | 2/1963 | Somers et al. | 153—35 |
| 3,086,575 | 4/1963 | Kowal | 153—80.5 |

FOREIGN PATENTS

| | | |
|---|---|---|
| 222,623 | 7/1959 | Australia. |

OTHER REFERENCES

"Forming goes Ultrasonic," American Machinist/Metalworking Manufacturing, vol. 105, No. 24, Nov. 27, 1961, pp. 83–85.

CHARLES W. LANHAM, *Primary Examiner.*